US009426170B2

(12) United States Patent
Srinivasan et al.

(10) Patent No.: US 9,426,170 B2
(45) Date of Patent: Aug. 23, 2016

(54) IDENTIFYING TARGET CUSTOMERS TO STEM THE FLOW OF NEGATIVE CAMPAIGN

(71) Applicant: Adobe Systems Incorporated, San Jose, CA (US)

(72) Inventors: Balaji Vasan Srinivasan, West Mambalam (IN); Akshay Kumar, Rajasthan (IN); Shubham Gupta, Pune (IN); Khushi Gupta, Pune (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 181 days.

(21) Appl. No.: 14/056,624

(22) Filed: Oct. 17, 2013

(65) Prior Publication Data

US 2015/0113056 A1 Apr. 23, 2015

(51) Int. Cl.
| | |
|---|---|
| *H04L 29/08* | (2006.01) |
| *H04L 29/06* | (2006.01) |
| *G06Q 10/06* | (2012.01) |
| *G06N 7/00* | (2006.01) |
| *G06F 17/30* | (2006.01) |
| *G06Q 50/00* | (2012.01) |

(52) U.S. Cl.
CPC ............ *H04L 63/1433* (2013.01); *G06F 17/30* (2013.01); *G06N 7/005* (2013.01); *G06Q 10/0635* (2013.01); *G06Q 50/01* (2013.01); *H04L 67/22* (2013.01)

(58) Field of Classification Search
CPC ..... G06F 21/56; H04L 51/32; H04L 63/1433; G06Q 10/0635; G06N 7/005
See application file for complete search history.

(56) References Cited

U.S. PATENT DOCUMENTS

| 8,065,731 B1* | 11/2011 | Nucci .................. G06F 21/568 713/187 |
| 2015/0067849 A1* | 3/2015 | Agrawal ................. G06F 21/56 726/23 |

OTHER PUBLICATIONS

Cern Budak, Limiting the Spread of Misinformation in Social Networks, Mar. 28-Apr. 2011, University of California, World Wide Web Conference Committee.*
W. Chen, Y. Yuan, and L. Zhang. Scalable influence maximization in social networks under the linear threshold model. In ICDM, pp. 88-97, 2010.*
Saptarshi Ghosh, Understanding and Combating Link Farming in the Twitter Social Network, WWW 2012—Session: Security and Fraud in Social Networks, Apr. 16-20, 2012.*

* cited by examiner

*Primary Examiner* — Chirag R Patel
(74) *Attorney, Agent, or Firm* — Shook, Hardy & Bacon L.L.P.

(57) ABSTRACT

A system and method for stemming flow of information from a negative campaign are described. A status for each node of a set of preselected nodes in a social network graph is identified. The status indicates whether a node has been infected with information from a negative campaign. A source and a flow of the negative campaign are identified based on the status of the nodes from the set of preselected nodes and a topology of the social network graph. A susceptibility score is computed for one or more nodes of the social network. The susceptibility score is computed using a measure of vulnerability of nodes that have not received the information based on the flow of the negative campaign, and a measure of reachability of nodes from the source. Nodes susceptible to adopting and spreading the information from the negative campaign are identified based on the susceptibility score.

18 Claims, 10 Drawing Sheets

400

---
Algorithm 2 Proposed Algorithm for Rumor Source Identification
---
Require: $G, M^+, M^-$
 1: Reverse the graph $G$
 2: $P_1 = \{\}$
 3: for $i$ in $M^+$ do
 4: $\quad S =$ set on nodes which can be infected had $i$ been the rumor source
 5: $\quad$ Append $S$ to $P_1$
 6: end for
 7: $P = \bigcap_{i \in P_1} i$
 8: $N_1 = \{\}$
 9: for $i$ in $M^-$ do
10: $\quad S =$ set on nodes which can't be infected had $i$ been the rumor source
11: $\quad$ Append $S$ to $N_1$
12: end for
13: $N = \bigcap_{i \in N_1} i$
14: $R = P \cap N$
15: return $R$
---

---
Algorithm 3 Algorithm to measure reachability of node from the estimated sources
---
Require: $G = (V, E, w), R$
1:   $G' = (V', E', w')$ : new directed weighted graph
2:   for $i$ in $V$ do
3:     Add $-i$ and $i$ to $V'$
4:     Add $(-i, i)$ to $E'$
5:     $w'_{-i,i} = pg(i)$ where $pg(i)$ is the pagerank of node $i$ in $G$
6:   end for
7:   for $(i,j)$ in $E$ do
8:     Add $(i, -j)$ to $E'$
9:     $w'_{i,-j} = w_{i,j}$
10:   end for
11:   for $(i,j)$ in $E'$ do
12:     $lw(e) = -\ln w(e)$
13:   end for
14:   for $i$ in $V$ do
15:     if $R$ and $-i$ are connected in $G'$ then
16:       $psus(i) = shortest\_path\_length(G', R, -i, key = lw)$
17:     else
18:       $psus(i) = \infty$
19:     end if
20:   end for
21:   for $i$ in $V$ do
22:     $sus(i) = e^{-psus(i)}$
23:   end for
24:   return $sus$

---
Algorithm 4 Vulnerability Score
---
Require: $G = (V, E, w)$
1: $G' = (V', E, w)$ : Status of Graph $G$ after delay $r$
2: for $i \in V$ and $i$ not infected do
3:     $bc(i) = ModifiedBetweenessCentrality(i)$
4: end for
5: for $k$ in $1 \to \infty$ do
6:     $G' = (V', E, w)$ : Status of Graph $G$ after time $r + k$
7:     for $i \in V$ and $i$ is not infected do
8:       $sus(i) = \sum_{\substack{(i,j) \in E \text{ and} \\ j \text{ is infected}}} w(e_{i,j}) * e^{-\mu*(r+k-r)}$
9:     end for
10: end for
11: return $\alpha * sus + \beta * bc$
---

*FIG. 6*

IDENTIFYING TARGET CUSTOMERS TO STEM THE FLOW OF NEGATIVE CAMPAIGN

TECHNICAL FIELD

The present application relates generally to the technical field of computer graphics, and, in various embodiments, to systems and methods for identifying nodes in a social graph to stem a flow of negative campaign.

BACKGROUND

Social Networks play an important role as a medium to propagate information among people. Marketers use the medium to campaign for their products and influence customers. However, the enormous size and connectivity of the social network can also facilitate propagation of negative information in the social network. The spread of the negative information, if not addressed properly, can rapidly tarnish brand images.

Stemming any flow of negative information can be particularly difficult because it may not be possible to reach out to every customer in the social network to correct the negative information. Previous attempts to limit the effect of the spread of negative information in a social network rely on a key assumption that the network status of the entire social network is available. However, it is difficult to assess the network status of large real-world social networks.

BRIEF DESCRIPTION OF THE DRAWINGS

Some embodiments of the present disclosure are illustrated by way of example and not limitation in the figures of the accompanying drawings, in which like reference numbers indicate similar elements and in which:

FIG. 4 illustrates an example embodiment of an algorithm for identifying a source of a negative campaign;

FIG. 5 illustrates an example embodiment of an algorithm for measuring reachability of a node from estimated sources;

FIG. 6 illustrates an example embodiment of an algorithm for measuring a vulnerability score of a node;

DETAILED DESCRIPTION

Figure 1:
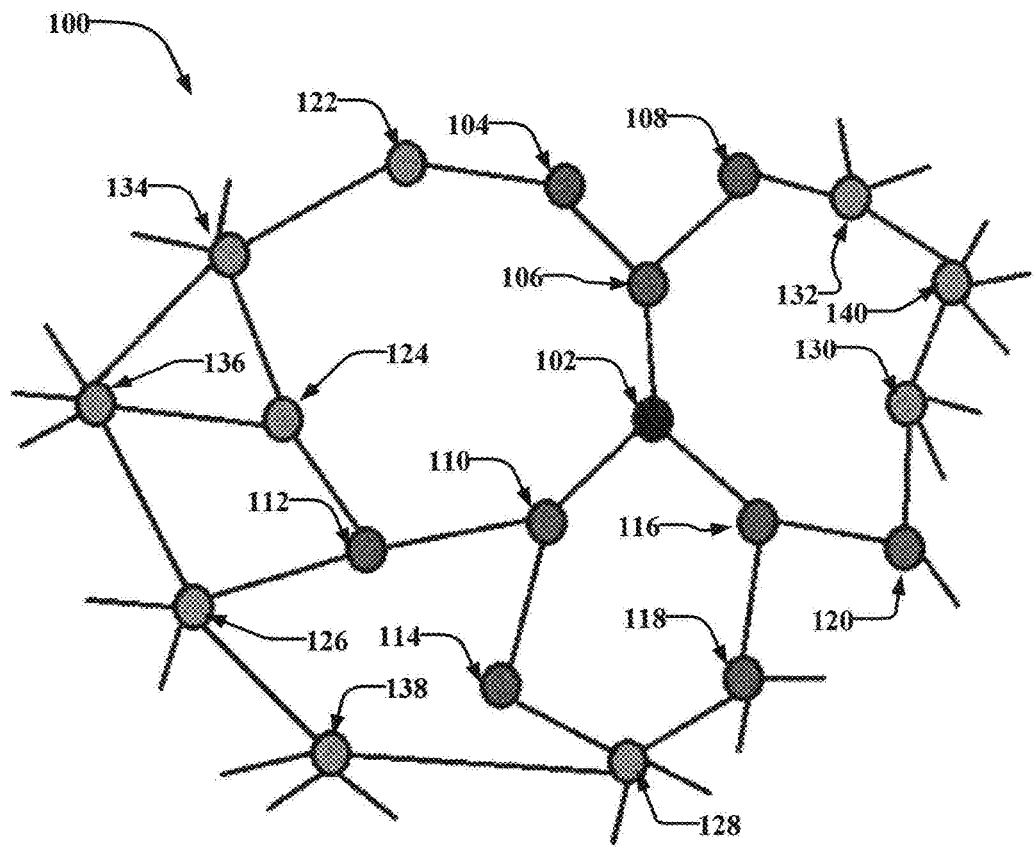
FIG. 1 is a diagram illustrating an example of a social network graph.

The description that follows includes illustrative systems, methods, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

A system and method for stemming a flow of information from a negative campaign in a social network are described. In one embodiment, the present disclosure describes a method for limiting the spread of information from a negative campaign (e.g., rumors, information damaging to a person or entity) using partial information about the social network. The partial information may include status information from a set of preselected nodes from the social network. The status of each node of the set of preselected nodes is determined. The status may indicate whether a node has received information from the negative campaign and has been infected with the information from the negative campaign. One or more sources of the negative campaign are identified or estimated based on the status of the nodes from the set of preselected nodes and a topology of the social network. The flow of the negative campaign may also be determined from the status of the nodes from the set of preselected nodes.

A susceptibility score is computed for nodes in the social network. The susceptibility score may be indicative of how much a node is susceptible to adopting and spreading the information from the negative campaign. In one embodiment, the susceptibility score is computed using a combination of a measure of vulnerability of nodes that have not received the information based on the flow of the negative campaign, and a measure of reachability of the nodes from the estimated sources. For example, a node may have a high level of vulnerability when that node has not yet received the information from the negative campaign but may have strong connections with other infected nodes that have high page ranking (e.g., influential nodes). A node may have a high level of reachability from the estimated sources when that node has relatively short connection paths from infected nodes.

In another example embodiment, given a negative campaign of negative information spreading across the social network and a partial or incomplete snapshot of the social network after a certain time delay r, the spread of the negative information is estimated across the whole social network. A measure of susceptibility of each node across the social network to the negative campaign is then determined. Based on the susceptibility, the present algorithm estimates a set of target nodes to be inoculated to effectively stem the spread of the negative campaign. For example, the algorithm identifies a set of "savior" nodes to whom "positive information" may be seeded to best reach identified target nodes to be inoculated.

As such, given a partial observation of the social network's infection status with respect to the negative information, the present algorithm estimates the potential sources of the negative information. Furthermore, given a set of potential sources of the negative information, two algorithms are presently described to provide a mechanism to rank and order the nodes of the social network in terms of their susceptibility to be infected by the negative information. The first algorithm calculates the nodes' susceptibility, which is then used to identify a set of nodes of the social network to "target" in order to stem the flow of the information. Given the identified set of target nodes, a second algorithm is then described to identify influencers (e.g., nodes with relatively high influences) of the set of target nodes.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a diagram illustrating an example of a social network graph 100. Node 102 may be the source of a negative campaign. The negative campaign may include, for example, an information campaign design to spread information about a person or an entity. For example, the information may be characterized as a negative if the information adversely affects a reputation of the person or entity. In another example, the campaign may be considered negative if the information about the person or entity renders a generally negative opinion or view of the person or entity. In another embodiment, the present application may be applicable to any type of campaign whether positive or negative.

In other words, node 102 has started spreading negative information to nodes 104, 106, 108, 110, 112, 114, 116, 118, and 120 that are located within a "short" connection path of node 102. For example, nodes may be in a short connection path when they are within one or more degrees of each other. In the example of FIG. 1, nodes 106, 110, and 116 are within one connection degree of node 102. As such, nodes in the immediate vicinity of node 102 may be infected immediately whereas nodes which are farther away (e.g., higher number of connections) may not be immediately infected. However, if those nodes were left without intervention, eventually a major part or the entire the social network may be infected with the negative information.

As shown in FIG. 1, nodes 104, 106, 108, 110, 112, 114, 116, 118, and 120 have been infected with negative information from the negative campaign. A node is "infected" when that node has received the negative information and has adopted the negative campaign by spreading the negative information further to other nodes. The present disclosure describes how to identify nodes that are vulnerable to adopting the negative campaign or to get infected with the negative information. For example, nodes 122, 124, 126, 128, 130, and 132 are most vulnerable because they are located adjacent to infected nodes and are thus in the immediate path of the spread of the negative information from the negative campaign. Nodes 134, 136, 138, and 140 are located further remotely down the path of the spread of negative information and are thus less vulnerable to the negative information than nodes 122, 124, 126, 128, 130, and 132.

Identifying the set of nodes (e.g., nodes 122, 124, 126, 128, 130, and 132) that are most vulnerable to the negative campaign can help marketers reach out to vulnerable nodes to potentially stem the flow of negative information throughout the social network.

In another embodiment, two sets of nodes may be identified: one set of nodes for nodes that have seen the negative information but who have not adopted it (e.g., not spread it), another set of nodes for nodes that have not seen the negative information (i.e., are not infected). The present disclosure provides a mechanism to assign a score to each of these sets and automatically identify the customers to target to minimize the spread of negative information.

Figure 2:
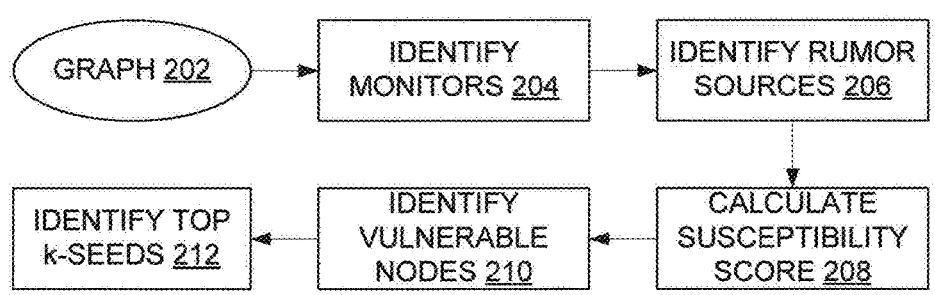
FIG. 2 is a block diagram illustrating an example embodiment of a flow process of an algorithm for identifying target nodes to stem the flow of information.

FIG. 2 is a block diagram illustrating an example embodiment of a flow process of an algorithm for identifying target nodes to stem the flow of information. The algorithm identifies nodes susceptible to information from a negative campaign (e.g., rumors) that is already spreading in a social network (such as the one illustrated in FIG. 1). Those susceptible nodes are targeted with positive information to stem the flow or spread of the negative information.

The method operates on a graph 202 of a social network where network status of each node of the social network is seldom available. In one embodiment, the status of a few nodes in the network can be accurately identified at operation 204. These few nodes may also be referred to as "node monitors" that provide information as to whether they have seen or received negative information from the negative campaign For example, for an enterprise, these node monitors may include a set of brand loyalists, evangelists, or well-wishers who can accurately report about the negative campaign. These node monitors who have received the negative information may be referred to as "positive monitors." Node monitors who have not received the negative information may be referred to as "negative monitors."

Based on the status of these node monitors, the status of the extent of the negative campaign in the social network may be determined. In particular, a first algorithm estimates the source(s) of the negative information from the status of node monitors at operation 206. After location of the sources is estimated, the status of the social network may be determined at a time step r by using standard diffusion models.

Once the network infection status is approximately known, each node in the social network is scored for their corresponding susceptibility to the negative information at operation 208. The nodes are then categorized into three types of nodes based on their score: infected, highly susceptible, and not infected at operation 210 to identify vulnerable nodes. Infected nodes are nodes that have been infected until the time r and hence are assumed to be not "curable". The highly susceptible nodes if left unattended may become infected with the negative information. Therefore, these nodes may be targeted with the positive information to stem the flow of the negative information. As such, two algorithms may be used to compute the susceptibility score of the social network at operation 208.

After identifying the "highly susceptible" or vulnerable targets at operation 210, influencers (i.e., nodes with a relatively high page rank, or top k-seeds) who can to efficiently reach out to the highly susceptible targets are identified at operation 212.

Figure 3:
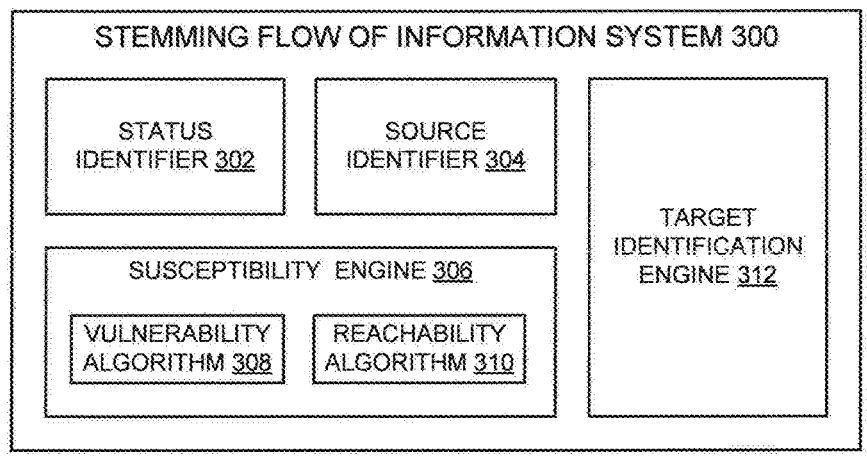
FIG. 3 illustrates a block diagram of a system for stemming flow of information.

FIG. 3 illustrates a block diagram of a system 300 for stemming a flow of information. The system 300 includes, for example, a status identifier 302, a source identifier 304, a susceptibility engine 306, and a target identification engine 312.

The status identifier 302 may identify and select nodes to be monitor nodes from a social network to provide status information (i.e. whether the selected nodes are infected with negative information). For example, given a social network, $G=(V, E, w)$ where V is the set of nodes, E belongs to $V \times V$ and w: $E \rightarrow R+$, a set of monitor nodes M whom can be pinged to determine their status is identified. R represents real numbers. Because, the status of every node in the social network may be difficult to determine, the status identifier 302 selects monitor nodes in a way that best captures and represents the state of the entire social network (e.g., nodes may be selected in a way that best represents the status of the negative campaign in the social network).

In a first embodiment, the status identifier 302 randomly selects nodes from the social network to be monitor nodes.

In a second embodiment, the status identifier 302 selects nodes from the social network to be monitor nodes based on degree centrality. For example, k nodes with the highest indegrees are selected as monitor nodes. In a platform such as Facebook or Twitter, in-degree denotes the number of followers. Top k-nodes in the social network with maximum followers are chosen.

In a third embodiment, the status identifier 302 selects nodes from the social network to be monitor nodes based on a ranking of between-ness centrality nodes of the social network. Betweenness centrality measures a node's centrality in a social network by calculating the number of shortest paths from all vertices to all others that pass through that node. This is an indicator of both the load and importance of a node. For example, top ranked nodes may be selected as monitor nodes.

In a fourth embodiment, the status identifier 302 selects nodes from the social network to be monitor nodes based on inter-node distances. For example, nodes may be chosen as monitor nodes when they are at least d "hops" away from each other.

In another embodiment, the status identifier 302 may select nodes from the social network to be monitor nodes based on any combination of the aforementioned heuristics.

The source identifier 304 identifies a source of information, or a source of a negative campaign. In one embodiment, the source identifier 304 operates an algorithm, illustrated in FIG. 4, to identify the source(s) of the negative campaign. The algorithm illustrated in FIG. 4 identifies the rumor sources by exploiting the status/state of the monitor nodes and the topology of the social network. Given the set of positive monitor nodes M+ (monitors who have seen the negative campaign) and negative monitor nodes M− (monitors who have not seen the negative campaign), the following assumptions are made:

The rumor source(s) infects all positive monitor nodes (M+).
The rumor source(s) does not infect any of the negative monitor nodes (M−).

Given a graph G' and a rumor source R, let S be the set of infected nodes. Another graph G' is obtained by reversing all the edges of the original graph G. Then, for any i S, had i been the rumor source for the graph G', the node R ought to be infected.

As such, instead of iterating over all the nodes in a social network graph, only a limited set of nodes are considered. The limited set of nodes includes, for example, nodes that are likely to be infected had positive monitor nodes been the rumor source and nodes that are not infected if negative monitor nodes were the rumor source are considered. No metrics of distance from positive monitor nodes and negative monitor nodes are taken into consideration because the distance metric does not truly capture the behavior of the social network. Information either reaches a node or does not reach the node regardless of the distance between nodes.

Unlike previously known algorithms, the metrics of distance from positive monitor nodes and negative monitor nodes are not taken into consideration because the distance metric does not truly capture the behavior of the social network. Information either reaches a node or does not reach the node regardless of the distance between nodes.

Once the potential rumor source(s) and the spread of negative information from the rumor source has been identified, the nodes are classified into three categories:

1) Category 1: nodes that have seen the rumor (e.g., negative information) and have started spreading the rumor. These nodes may thus be infected beyond repair. In other words, these nodes cannot be influenced with a positive campaign and cannot be used to assist the positive campaign.

2) Category 2: nodes that have either seen the rumor (e.g., negative information) and are not affected by the rumor or nodes that may see the rumor "soon" from one of the infected nodes. This set of nodes is critical to stemming the flow of rumor, because if not attended to, the nodes from this set of nodes may quickly move to Category 1.

3) Category 3: nodes that are not infected and may not be infected soon.

Once the source identifier 304 estimates the spread of the negative information from potential source(s), the susceptibility engine 306 categorizes each node from the set of nodes into one of the previously described categories. In one embodiment, the susceptibility engine 306 calculates the susceptibility of the nodes using two different algorithms to categorize the nodes:

1) Vulnerability algorithm 308 (algorithm to measure vulnerability of a node that has not seen the negative campaign or received negative information from the negative campaign).

2) Reachability algorithm 310 (algorithm to measure reachability of a node from the estimated sources).

In one embodiment, the vulnerability algorithm 308 measures the susceptibility of a node from estimated source(s) based on the node's susceptibility to spread and infectiousness. In the second algorithm, three factors are considered: susceptibility score, decay, and infectiousness.

The susceptibility score may be calculated using the predicted snapshot of the social network at time r. For the nodes who will get infected at time r+1, the reachability algorithm 310 determines all the incoming edges. The susceptibility score may be calculated as the sum of the incoming edge weights that originate from infected nodes. In general, to calculate the susceptibility of nodes at the (r+k)th frontier, the reachability algorithm 310 assumes that the negative information has reached the (r+k+1)th frontier, and calculates the susceptibility score as $sus(v)r+k=\Sigma(u;v) \in E \wedge Infect(u)=1 \wedge u$ is infected in (r+k−1)th frontier w(euv)

The vulnerability algorithm 308 takes into account the decay rate of a node over time by discounting the susceptibility score of each node to time step r. This captures the actual susceptibility of a node at time r, $sus(v)r=sus(v)r+ke^{-(r+k-r)}$ The vulnerability algorithm 308 takes into account infectiousness. The infectiousness may be defined and calculated as follows: for each node that has not been infected at time r, the vulnerability algorithm 308 calculates how infectious the nodes are by computing its modified betweeness centrality. In one embodiment, the vulnerability algorithm 308 calculates the fraction of shortest paths from infected to uninfected nodes that pass through the node.

$bc(v)=\Sigma s=v=t$, s∈Infected, v;t∈Not Infected, σst(v),σst, where σs;t(v) represents the number of shortest paths from node s to node t that pass through v and σs;t represents the total number of shortest paths from node s to node t.

The vulnerability algorithm 308 calculates the final score as a weighted sum of the susceptibility at r and the infectiousness of a node as $\alpha\_sus+\beta\_bc$, where $\mu$, $\alpha$, $\beta$ are experimentally determined.

In one embodiment, the reachability algorithm 310 modifies the edge weight wij between nodes i and j of a graph as −ln(PRiwij) where PRi is the Page Rank of the node i indicative of its prominence in the network. The shortest path between the source and each node is estimated as its susceptibility index (psus).

In one embodiment, the reachability algorithm 310 defines θ as a measure to categorize nodes into the previously described categories since the difference between the two values is very low. Also, the susceptibility engine 306 uses the geometric mean instead of the arithmetic mean to compute susceptibility score because of the way susceptibility index is defined. Nodes having a susceptibility index greater then θ0 are deemed as infected. Nodes having a susceptibility index less then θ0 are deemed not infected.

The reachability algorithm 310 then divides the set of infected nodes into two categories: strongly infected nodes and mildly infected nodes. Strongly infected nodes are nodes with a very high susceptibility index and have a tendency not to change their state once infected. Mildly infected nodes are not with a lower susceptibility index and may change their state once infected. In one embodiment, the set of mildly infected nodes are targeted with a positive campaign.

A new threshold θ1 is defined to determine and classify infected nodes as either strongly infected or mildly infected. The new threshold θ1 may be defined as $\theta1=\exp(-|\mu(psus)-\sigma(psus)|)$, where psus is the set of scores obtained in the vulnerability algorithm 308 for all the nodes as illustrated in FIG. 4. μ and σ of psus are taken into account because of the way susceptibility index is defined.

An example of an algorithm for calculating the reachability score is illustrated in FIG. 5. Nodes that are not connected to infected nodes are deemed not infected and thus may be categorized in category 3. Among the remaining nodes, the categorization may be performed by choosing the top 50 percentile as infected and the rest of the nodes as vulnerable.

One difference between the algorithm illustrated in FIG. 5 and the algorithm illustrated in FIG. 6 is that the algorithm illustrated in FIG. 5 finds target nodes that may have seen or not seen the rumor/negative campaign and are vulnerable, whereas the algorithm illustrated in FIG. 6 finds the vulnerability score based on connectedness to already infected nodes.

In another embodiment, both the algorithms can be used to identify nodes in category 2 that have to be targeted with the positive campaign.

Referring back to FIG. 3, once the susceptibility engine 306 categorizes the nodes into one of the three categories, the target identification engine 312 identifies nodes with influence to seed positive information. In one embodiment, the susceptibility engine 306 identifies nodes in category 2 and 3 as nodes with influence. Category 1 cannot be used for the positive campaign because the nodes have been exposed to the negative information and are "beyond repair." In other words, no amount of positive information may convince the nodes otherwise.

Figure 7:
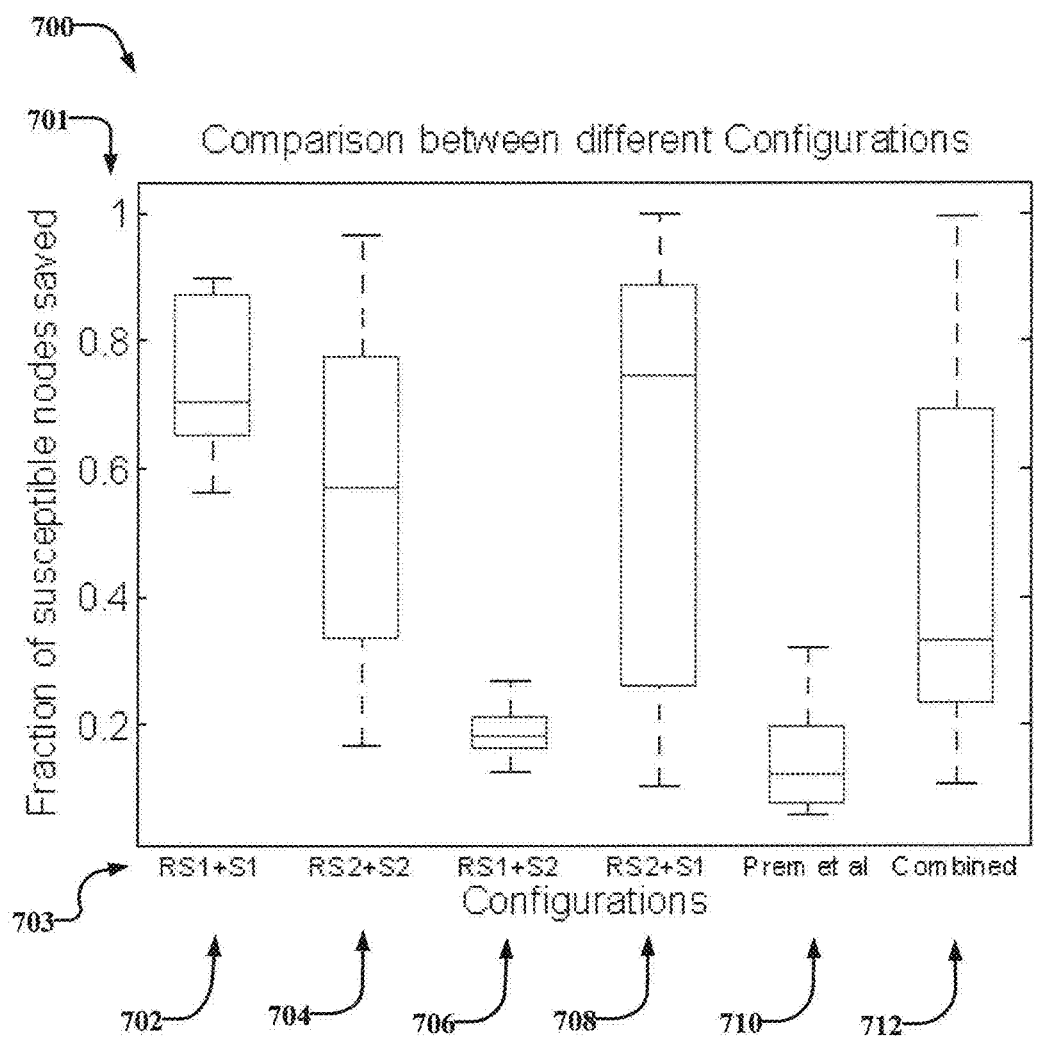
FIG. 7 is a box plot graph illustrating a comparison between different algorithm configurations.

FIG. 7 is a box plot graph 700 illustrating a comparison of ratios of susceptible nodes saved using different algorithms. The vertical axis 701 represents the fraction of susceptible nodes "saved" from a negative campaign. For example, an intervention using a positive campaign may have immunized the nodes against the information from the negative campaign. The horizontal axis 703 represents the different algorithm configurations. RS1 corresponds to a known algorithm for rumor source identification. RS2 corresponds to the algorithm for identifying the source(s) of a negative campaign or rumor using status of monitor nodes from FIG. 4. S1 corresponds to the algorithm for measuring reachability of a node from an estimated source(s) from FIG. 5. S2 corresponds to the algorithm for computing a vulnerability score from FIG. 7. The "Prem at al" label corresponds to a known algorithm referred to as "Shapley value based approach." The boxes in the box plot graph 700 illustrate corresponding range results for each algorithm configuration. The line across each box represents the median from each corresponding range result.

The first algorithm configuration 702 includes using the rumor source algorithm RS1 in combination with the susceptibility algorithm S1. The second algorithm configuration 704 includes using the rumor source algorithm RS2 in combination with the susceptibility algorithm S2. The third algorithm configuration 706 includes using the rumor source algorithm RS1 in combination with the susceptibility algorithm S2. The fourth algorithm configuration 708 includes using the rumor source algorithm RS2 in combination with the susceptibility algorithm S1. The fifth algorithm configuration 710 includes using the "shapley value based approach" algorithm. The sixth algorithm configuration 712 includes the combined scores of the first, second, third, and fourth algorithms, and corresponds to the "combined" label on FIG. 7.

As previously described, two approaches are described for rumor source identification (e.g., known algorithm (RS1) and algorithm from FIG. 4 (RS2)). Two approaches are also described for assigning susceptibility scores (e.g., algorithm from FIG. 5 (S1) and algorithm from FIG. 7 (S2)) resulting in four distinct algorithm configurations (e.g., RS1+S1, RS2+S2, RS1+S2, RS2+S1). Additionally, the target nodes are determined based on the combined two scores into the fifth configuration (e.g., "combined"). The influencers (e.g., nodes with clout or influence) to reach out to these target nodes are evaluated using the algorithm from FIG. 8 and the spread is estimated using an algorithm (e.g., Multi-Campaign Independent Cascade Model).

The box plot graph 700 of FIG. 7 illustrates an example of a result of an experiment using the presently described frameworks on a data set collected by collecting the followers of a specific twitter handle along with information on their connections and tweets. The network had around five hundreds nodes. Each experiment was repeated for several trials by randomly selecting a source and simulating the information flow based on the edge weights and considering this as ground truth.

In the first experiment, the fraction of network saved by the present algorithm is calculated. The spread of the rumor is estimated without any positive campaign in the network using the standard ICM and then compared with the case had there been a positive campaign propagating using the MCICM model. The number of nodes saved from the infection is then calculated.

The box plot graph 700 shows the fraction of nodes saved in each of the algorithm configurations. The box plot graph 700 shows that the first, second, and fourth algorithm configurations 702, 704, 708 performed relatively well. The third algorithm configuration 706 performed poorly. Even among the first, second, and third algorithm configurations 702, 704, 706, first and fourth algorithm configurations 702, 708 had a large deviation in comparison to second algorithm configuration 704. Thus, the box plot graph 700 shows that the first, second, third, and fourth algorithm configurations 702, 704, 706, and 708 perform significantly better than the fifth algorithm 710 (Shapely value-based approach algorithm). In other words, more susceptible nodes are saved using the first, second, third, and fourth algorithm configurations 702, 704, 706, 708, and the combined algorithm configuration 712.

Figure 8:
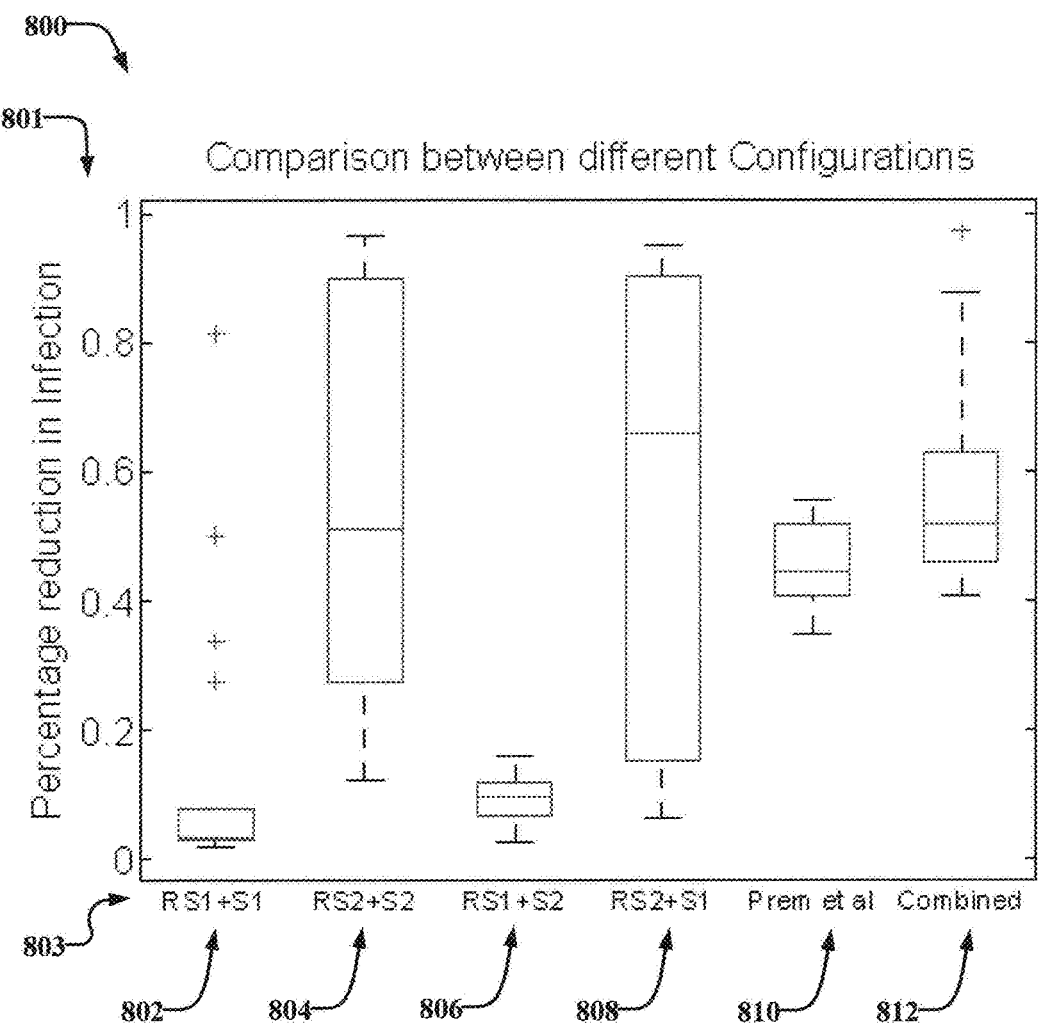
FIG. 8 is another box plot graph illustrating a comparison between different algorithm configurations.

FIG. 8 is another graph illustrating a comparison between different algorithm configurations. FIG. 8 is a box plot graph 800 illustrating a comparison of percentage reduction in infection using different algorithm configurations. The vertical axis 801 represents the percentage reduction in infection of nodes from a negative campaign. The horizontal axis 803 represents the different algorithm configurations similar to those described with respect to FIG. 7.

The box plot graph 800 shows the percentage of reduction in infection of nodes saved in each of the configurations. The box plot graph 800 shows that the second, fourth, and combined algorithm configurations 804, 808, and 812 performed relatively well. The first and third algorithm configurations 802 and 806 performed poorly. Thus, the box plot graph 800 shows that the combined algorithm configuration 812 performs better than the Shapely value based approach algorithm 810. In other words, more nodes are saved using the combined algorithm configuration 812.

Figure 9:
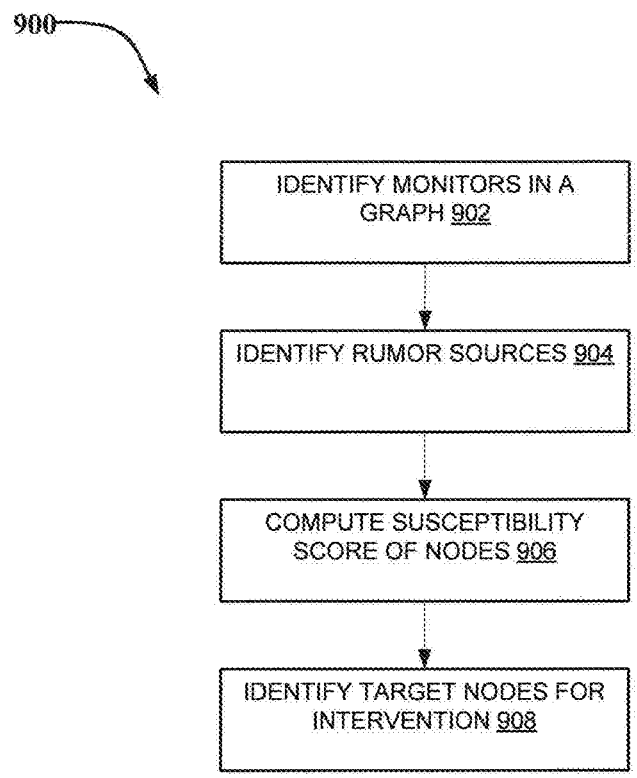
FIG. 9 is a flow diagram illustrating a method for identifying target nodes for intervention.

FIG. 9 is a flow diagram illustrating a method 900 for identifying target nodes for intervention. At operation 902, the monitor nodes in a social network graph are identified. In one embodiment, the status identifier 302 of FIG. 3 identifies monitor nodes and monitors status of the monitor nodes.

At operation 904, source(s) of the negative campaign or rumors are identified based on the status of the monitor nodes (e.g., infected with negative information, not infected with negative information). In one embodiment, the source identifier 304 of FIG. 3 determines the source of the negative campaign.

At operation 906, the susceptibility score of each node is computed based on the source of the negative campaign, the spread/flow of the negative campaign, and the topology of the social network. In one embodiment, the susceptibility engine 306 computes the susceptibility score using a combination of the vulnerability algorithm 308 and the reachability algorithm 310 for one or more nodes of the social network.

At operation 908, target nodes are identified for intervention. Target nodes may include susceptible nodes that, if not intervened within a relatively short amount of time, will then become infected with the information from the negative campaign. In one embodiment, the target identification engine 312 determines nodes that have not been infected and that have the most influence (as determined by the social network topology) on the target nodes. For example, a node having a higher number of reputable connections (e.g., edge weight) will likely have more influence onto its connected nodes. Those of ordinary skill in the art will recognize that influence may be computed in other ways based on, for example, the number of communications, the social status of a node, the reputation of a node, and so forth.

Figure 10:
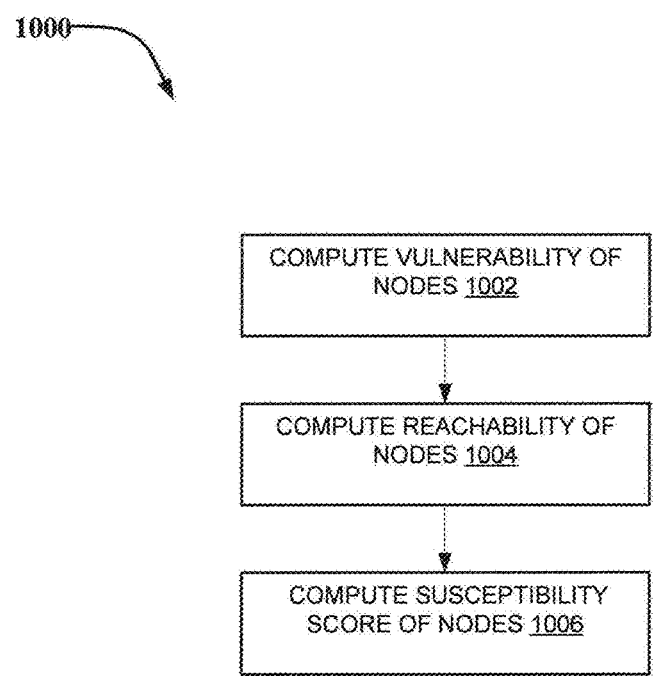
FIG. 10 is a flow diagram illustrating a method for computing susceptibility of nodes.

FIG. 10 is a flow diagram illustrating a method 1000 for computing susceptibility of nodes. At operation 1002, the vulnerability of a node is computed using, for example, the algorithm described in FIG. 6. In one embodiment, the computation of the vulnerability score of a node is performed using the vulnerability algorithm 308 of the susceptibility engine 306 of FIG. 3.

At operation 1004, a measure of the reachability of a node is computed using, for example, the algorithm described in FIG. 5. In one embodiment, the computation of the reachability of a node is performed using the reachability algorithm 310 of the susceptibility engine 306 of FIG. 3.

At operation 1006, the susceptibility score of a node is computed by combining the vulnerability score with a measure of reachability of a node. In one embodiment, the susceptibility score of a node is performed using the susceptibility engine 306 of FIG. 3.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. For example, software may accordingly configure a processor to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry or in computer hardware, firmware, software, or in combinations of them. Example embodiments may be implemented using a computer program product, (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and a server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below, are set out hardware (e.g., machine) and software architectures that may be deployed in various example embodiments.

Example Machine Architecture and Machine-Readable Medium

Figure 11:
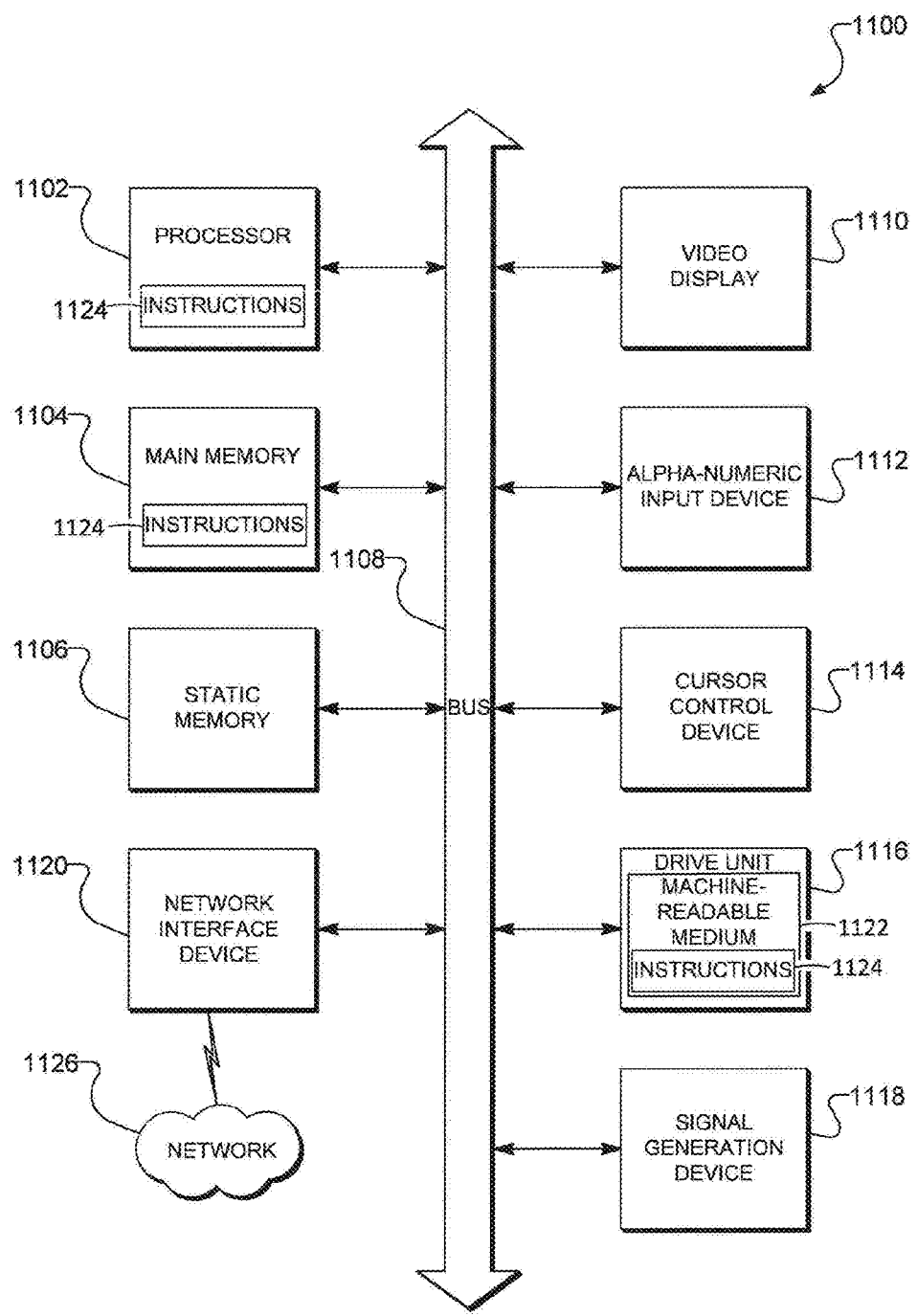
FIG. 11 shows a diagrammatic representation of a machine in the example form of a computer system within which a set of instructions may be executed to cause the machine to perform any one or more of the methodologies discussed herein.

FIG. 11 is a block diagram of a machine in the example form of a computer system 1100 within which instructions (e.g., 1126) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (e.g., 1126—sequential or otherwise) that specify actions to be taken by that machine. Further, while only a single machine is illustrated, the term "machine" shall also be taken to include any collection of machines that individually or jointly execute a set (or multiple sets) of instructions (e.g., 1126) to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation (or cursor control) device 1114 (e.g., a mouse), a disk drive unit 1116, a signal generation device 1118 (e.g., a speaker) and a network interface device 1120.

Machine-Readable Medium

The disk drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media. The instructions 1124 may also reside, completely or at least partially, within the static memory 1106.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding or carrying instructions (e.g., 1124) for execution by the machine and that cause the machine to perform any one or more of the methodologies of the present embodiments, or that is capable of storing, encoding or carrying data structures utilized by or associated with such instructions (e.g., 1124). The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; compact disc-read-only memory (CD-ROM) and digital versatile disc (or digital video disc) read-only memory (DVD-ROM) disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks 1126 include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions (e.g., 1124) for execution by the machine, and includes digital or analog communication signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. Therefore, this Detailed Description is not to be taken in a limiting sense, and the scope of various embodiments is defined only by the appended claims along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Although specific embodiments have been illustrated and described herein, it should be appreciated that any arrangement calculated to achieve the same purpose may be substituted for the specific embodiments shown. This disclosure is intended to cover any and all adaptations or variations of several embodiments. Combinations of the above embodiments and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the inventive subject matter lies in less than all features of a single disclosed embodiment. Thus, the following claims are hereby incorporated into the Detailed Description with each claim standing on its own as a separate embodiment.

What is claimed is:

1. A computer-implemented method comprising:
   identifying a status for each node of a set of preselected nodes in a social network graph, the status indicating whether a node has been infected with information from a negative campaign;
   identifying a source and a flow of the negative campaign based on the status of the nodes from the set of preselected nodes and a topology of the social network graph;
   computing a susceptibility score for one or more nodes of the social network graph, the susceptibility score computed using a measure of vulnerability of nodes that have not received the information based on the flow of the negative campaign, and a measure of reachability of nodes from the source;
   generating a discounted susceptibility score for the one or more nodes by reducing the computed susceptibility score based on a decay rate for the one or more nodes;
   identifying nodes susceptible to adopting and spreading the information from the negative campaign based on the discounted susceptibility score; and
   transmitting alternative information from a positive campaign to the identified nodes to prevent the adoption and spreading of the information from the negative campaign by the identified nodes.

2. The method of claim 1, further comprising:
   classifying the one or more nodes of the social network graph into one of three categories,
   a first category including nodes that have been infected with the information, and have spread the information to other nodes,
   a second category including nodes that have received the information and are not affected by the information, and nodes that have not received the information but are within immediate reach of receiving the information using the susceptibility score for the one or more nodes of the social network graph, and
   a third category including nodes that have not received the information and are not within immediate reach of receiving the information using the susceptibility score for the one or more nodes of the social network graph.

3. The method of claim 2, further comprising:
   transmitting the alternative information from the positive campaign to at least one node from the second category or third category.

4. The method of claim 2, further comprising:
   identifying nodes in the second and third category with an influence level exceeding an influence threshold; and
   transmitting the alternative information from the positive campaign to the identified nodes in the second and third category.

5. The method of claim 1, wherein the set of preselected nodes are selected randomly, based on degree centrality, based on between-ness centrality, or based on inter-node distance.

6. The method of claim 1, wherein identifying the source and the flow of the negative campaign further comprising:
   classifying a node from the preselected nodes with a negative status when the node has been infected with information from the negative campaign, and a positive status when the node has not been infected with information from the negative campaign; and
   identifying one or more source nodes of the negative campaign by reversing edges of the social network graph using the topology of the social network graph.

7. The method of claim 1, wherein identifying the source and the flow of the negative campaign further comprises:
   classifying a node from the preselected nodes with a negative status when the node has been infected with information from the negative campaign, and a positive status when the node has not been infected with information from the negative campaign; and identifying one or more source nodes of the negative campaign based on the status of the nodes from the preselected nodes and the topology of the social network.

8. The method of claim 1, further comprising:
identifying an edge weight between two nodes of the social network graph;
identifying a page rank of a node based on a topology of the social network graph; and
computing the measure of vulnerability of a node based on a product of a corresponding page rank and a corresponding edge weight of the node.

9. The method of claim 1, further comprising:
calculating a susceptibility of a node as a sum of edge weights that come from infected nodes;
calculating an infectiousness of the node; and
computing the measure of reachability of the nodes as a weighted sum of the susceptibility and infectiousness of the node.

10. A system comprising:
one or more processors; and
memory, coupled with the one or more processors, having instructions embodied thereon, which, when executed by the one or more processors cause the one or more processors to:
identify a status for each node of a set of preselected nodes in a social network graph, the status indicating whether a node has been infected with information from a negative campaign;
identify a source and a flow of the negative campaign based on the status of the nodes from the set of preselected nodes and a topology of the social network graph;
compute a susceptibility score for one or more nodes of the social network graph, the susceptibility score computed using a measure of vulnerability of nodes that have not received the information based on the flow of the negative campaign, and a measure of reachability of nodes from the source;
discount the susceptibility score based on a decay rate for the one or more nodes to produce a discounted susceptibility score for the one or more nodes;
identify nodes susceptible to adopting and spreading the information from the negative campaign based on the discounted susceptibility score; and
transmit alternative information from a positive campaign to the identified nodes to prevent the adoption and spreading of the information from the negative campaign by the identified nodes.

11. The system of claim 10, wherein the status identifier is further to classify the one or more nodes of the social network graph into one of three categories,
a first category including nodes that have been infected with the information, and have spread the information to other nodes,
a second category including nodes that have received the information and are not affected by the information, and nodes that have not received the information but are within immediate reach of receiving the information using the susceptibility score for the one or more nodes of the social network graph, and
a third category including nodes that have not received the information and are not within immediate reach of receiving the information using the susceptibility score for the one or more nodes of the social network graph.

12. The system of claim 11, wherein the target identification engine is further to:
transmit the alternative information from the positive campaign to at least one node from the second category or third category.

13. The system of claim 11, wherein the target identification engine is further to:
identify nodes in the second and third category with an influence level exceeding an influence threshold; and
transmit the alternative information from the positive campaign to the identified nodes in the second and third category.

14. The system of claim 10, wherein the set of preselected nodes are selected randomly, based on degree centrality, based on between-ness centrality, or based on inter-node distance.

15. The system of claim 10, wherein the source identifier is further to:
classify a node from the preselected nodes with a negative status when the node has been infected with information from the negative campaign, and a positive status when the node has not been infected with information from the negative campaign; and
identify one or more source nodes of the negative campaign by reversing edges of the social network graph using the topology of the social network graph.

16. The system of claim 10, wherein the susceptibility engine comprises a vulnerability algorithm module configured to:
identify an edge weight between two nodes of the social network graph;
identify a page rank of a node based on a topology of the social network graph; and
compute the measure of vulnerability of a node based on a product of a corresponding page rank and a corresponding edge weight of the node.

17. The system of claim 10, wherein the susceptibility engine comprises a reachability module configured to:
calculate a susceptibility of a node as the sum of edge weights that come from infected nodes;
calculate an infectiousness of the node; and
compute the measure of reachability of the nodes as a weighted sum of the susceptibility and infectiousness of the node.

18. A non-transitory machine-readable storage medium storing instructions which, when executed by at least one processor, causes the at least one processor to:
identify a status for each node of a set of preselected nodes in a social network graph, the status indicating whether a node has been infected with information from a negative campaign;
identify a source and a flow of the negative campaign based on the status of the nodes from the set of preselected nodes and a topology of the social network graph;
compute a susceptibility score for one or more nodes of the social network graph, the susceptibility score computed using a measure of vulnerability of nodes that have not received the information based on the flow of the negative campaign, and a measure of reachability of nodes from the source;
discount the susceptibility score based on a decay rate for the one or more nodes to produce a discounted susceptibility score for the one or more nodes;
identify nodes susceptible to adopting and spreading the information from the negative campaign based on the susceptibility score; and
transmit alternative information from a positive campaign to the identified nodes to prevent the adoption and spreading of the information from the negative campaign by the identified nodes.

* * * * *